No. 816,887. PATENTED APR. 3, 1906.
J. A. SNIGO.
ICE CREAM FREEZER.
APPLICATION FILED AUG. 1, 1904.

Witnesses:

Inventor
John A. Snigo,
By
Attorneys

UNITED STATES PATENT OFFICE.

JOHN A. SNIGO, OF PITTSBURG, PENNSYLVANIA.

ICE-CREAM FREEZER.

No. 816,887.　　Specification of Letters Patent.　　Patented April 3, 1906.

Application filed August 1, 1904. Serial No. 219,065.

*To all whom it may concern:*

Be it known that I, JOHN A. SNIGO, a citizen of the United States of America, residing at Pittsburg, in the county of Allegheny and State of Pennsylvania, have invented certain new and useful Improvements in Ice-Cream Freezers, of which the following is a specification, reference being had therein to the accompanying drawings.

This invention has relation to certain new and useful improvements in dashers for ice-cream cans, and relates more particularly to an attachment which is adapted to be connected to the ordinary form of dasher commonly used in ice-cream cans; and this invention has for its object to provide an attachment which will facilitate the freezing of the cream, whereby a greater quantity of frozen cream of a higher quality will be produced from a given amount of cream.

Another object of this invention is to provide an attachment which may be readily secured to dashers now commonly used, and the attachment is so constructed that the same will reciprocate within the can and prevent to a certain extent cream from freezing upon the bottom of the can, and the attachment is so secured to the dasher that the same will agitate the cream and produce a grade of frozen cream which will be of a fine consistency.

Briefly described, my invention consists of a strip of wood or like material which is loosely connected to the dasher, the one end of this strip being adapted to engage the bottom of the can. I secure the strip to the dasher by providing wire stirrups which are secured to the lateral arms of the dasher, these stirrups being of a sufficient size to permit a lateral and vertical movement of the strip therein.

Figure 1:
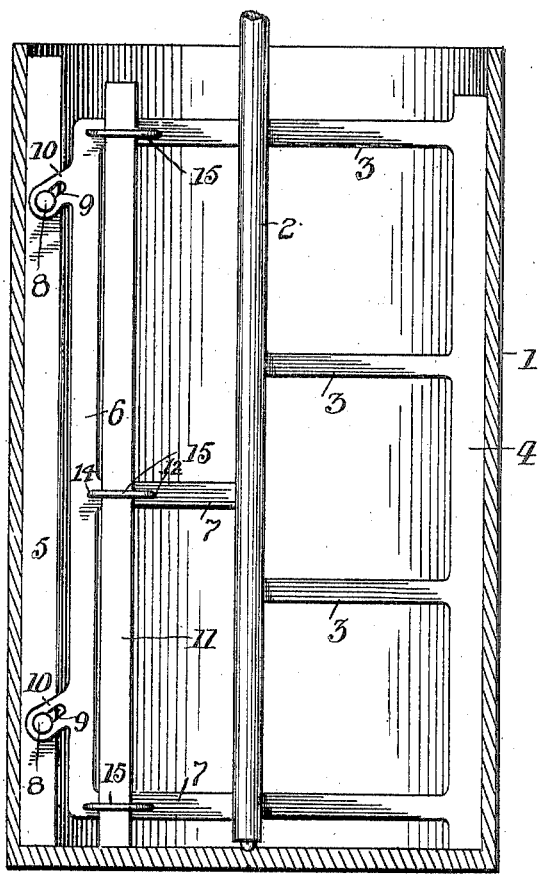
Figure 2:
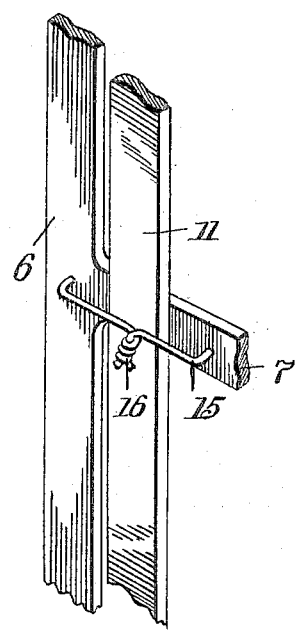
Figure 3:
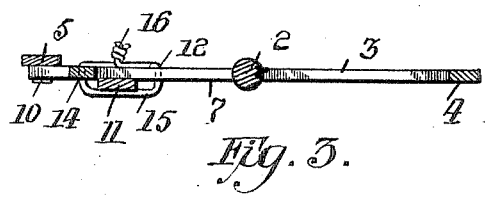

The above construction will be hereinafter more fully described, and, referring to the drawings accompanying this application, Figure 1 is a vertical sectional view of a freezing-can, showing the dasher mounted therein with my improved attachment secured thereto. Fig. 2 is a perspective view of a portion of the dasher, showing the manner of securing my improved attachment thereto. Fig. 3 is a transverse sectional view of the dasher and my improved attachment.

In the several views of the drawings accompanying this application like numerals of reference indicate like parts, and the reference-numeral 1 indicates a freezing-can in which the dasher is mounted. The dasher comprises a central shaft 2, which upon its one side carries the outwardly-extending arms 3 3, and formed integral with the outer ends of these arms is the vertical strip 4, which is adapted to engage the side of the freezing-can, as clearly shown in Fig. 1 of the drawings.

The reference-numeral 5 indicates a vertical scraper-bar which is loosely connected to the vertical strip 6, which is formed integral with the lateral arms 7 7, carried diametrically opposite the lateral arms 3 3 of the dasher. The scraper 5 is of the ordinary form and carries pins 8 8 near its end, which engage in the angularly-disposed slots 9 9, formed in the lugs 10 of the vertical strip 6.

My improved attachment consists of a strip 11, which is loosely connected to the lateral arms 7 7 of the dasher, this strip extending the entire depth of the can, and is connected to the lateral arms 7 7, preferably near the vertical strip 6. To loosely connect the strip 11 to the lateral arms 77, I provide the same with apertures 12 12, and in the vertical strip 6 and in horizontal alinement with the apertures 12, formed in the lateral arms, I provide apertures 14 14. In the apertures 12 and 14 are secured the wire yokes or stirrups 15. These stirrups are preferably constructed from a piece of wire the ends of which are placed through the apertures 12 and 14 and are twisted together, as designated by the reference-numeral 16, a sufficient space being allowed between the wire and the lateral arms 7 7 to permit the lateral movement of the strip 11, also to permit of a vertical movement of the strip should the same be actuated in this direction. By employing this strip in connection with the dasher for freezing cream I have found by experiment that a greater quantity of frozen cream can be obtained from the given quantity of cream than if this strip were not used, the approximate amount of increase in the volume of cream being about five to nine—that is, where five gallons of cream are frozen nine gallons of frozen cream are obtained—and when this strip is dispensed with it has only been possible to obtain from six to seven gallons of frozen cream from five gallons of the raw material. I have also found that the cream when frozen is of a finer consistency than cream agitated by the same dasher when the strip was dispensed with. The strip 11 also prevents the cream from freezing upon the bottom of the freezing-can, and should any cream adhere to the bottom of the can the operation of the dasher will not be interrupted, but the trips will be vertically moved to permit the free rotation of the dasher. It will thus be seen that I have provided an attachment for a dasher which will have a vertical and lateral movement upon the same, and the many advantages of the strip comprising my improved attachment will be apparent to those skilled in the art of manufacturing ice-cream.

While I have herein shown and described one strip in connection with the dasher, it is obvious that any number of these strips may be employed to accomplish the desired results, and other slight changes than this may be made without departing from the spirit of the invention.

What I claim is—

1. The combination with a dasher comprising a shaft and laterally-extending wings and having two scraper-bars, one of which has lateral movement independent of the dasher, of stirrups carried by the dasher adjacent said laterally-movable scraper-bar, and a strip held to the dasher by said stirrups and movable freely in a plane radial to the shaft independently of the dasher, as and for the purpose described.

2. The combination with a dasher comprising a shaft and laterally-extending wings carried thereby, said dasher having a movable scraper-bar carried by the wing at one side of the shaft, of a strip of material attached to one wing of the dasher between the outer end and the inner end of the said wing, and stirrups carried by the dasher and embracing said strip, said stirrup being of such size as to permit universal movement of said strip.

In testimony whereof I affix my signature in the presence of two witnesses.

JOHN A. SNIGO.

Witnesses:
 E. E. POTTER,
 K. H. BUTLER.